No. 789,463. PATENTED MAY 9, 1905.
E. THOMSON.
REACTIVE COIL.
APPLICATION FILED OCT. 1, 1904.
Fig. 1.
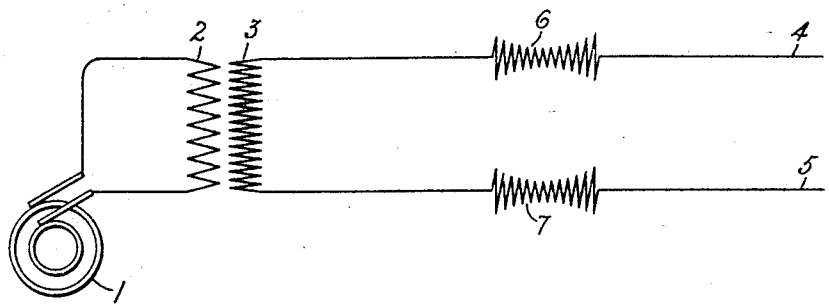
Fig. 2.
Fig. 3.
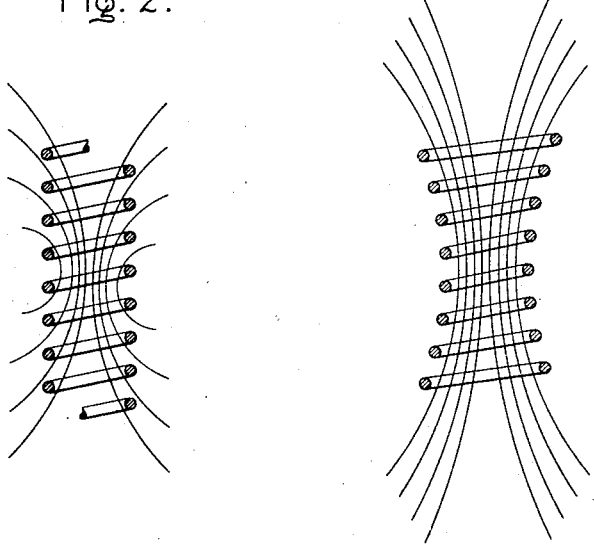
Witnesses:
George H. Tilden
Helen Orford
Inventor:
Elihu Thomson,
by Albert H. Davis
Att'y.

No. 789,463. Patented May 9, 1905.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

REACTIVE COIL.

SPECIFICATION forming part of Letters Patent No. 789,463, dated May 9, 1905.

Application filed October 1, 1904. Serial No. 226,747.

*To all whom it may concern:*

Be it known that I, ELIHU THOMSON, a citizen of the United States, residing at Swampscott, county of Essex, State of Massachusetts, have invented certain new and useful Improvements in Reactive Coils, of which the following is a specification.

In the protection of electric circuits from static strains and other abnormal voltages it has been found desirable to insert reactance coils between the generator or other power apparatus and the line conductors. These reactive coils operate to momentarily check the high-frequency static discharges, and so protect the winding of the generator from a sudden increase of high-frequency potential. While this form of protective device is suitable for use on direct-current systems, it is probably more useful in connection with alternating-current transmissions, particularly of the type in which current of high potential is transmitted over long distance, for in such systems the high insulation which must be maintained throughout the line prevents the ready escape of abnormal charges from the line, and the result is a severe strain on the insulation of the transformers or generators at the power-stations when the static charges traveling along the line strike these points. The strain on transformers is particularly severe between the first few turns, as these are subjected to practically the full voltage of the charge for the small interval of time which elapses before the charge has penetrated to the more distant turns of the winding, and if this momentary strain is too much for the insulation of these turns a spark will pass and the line-current is likely to follow and cause destructive burning. By the use of reactive coils in the line these high-frequency charges are retarded until the charging-current has penetrated far enough into the transformer or generator winding to distribute the charge over the coil and prevent the accumulation of an excessive potential on the outer turns.

It has been customary heretofore to use reactive coils in the form of a simple helix; and it is the object of this invention to provide a coil of special form whereby a better magnetic circuit is produced and certain other advantageous results are secured.

In the drawings, Figure 1 is a diagrammatic representation of a transmission system equipped with my improved coils. Fig. 2 shows the form of coil heretofore used, together with a diagrammatic representation of the magnetic field set up by such a coil; and Fig. 3 is a similar view of my improved form of coil, showing the advantageous distribution of the magnetic field.

The generator 1 supplies power to the low-pressure coil 2 of a transformer, the high-pressure coil 3 of which is connected to the line-wires 4 and 5. Reactive coils 6 and 7 are connected between the line-wires and the transformer to afford the protection heretofore mentioned. It should be understood, however, that this illustrates only one application of my improved form of reactive coil and that it may be used for many other purposes which will readily suggest themselves to a person skilled in the art.

In Fig. 2 the distribution of the lines of force set up by the current in the coil is such as to produce an inefficient reactive effect, for the magnetic lines set up by the turns near the center of the coil do not thread through the entire length of the coil, but instead take a shorter path and thread through only a comparatively small per cent. of the total number of turns. The result is a material decrease of reactance over that which could be obtained if all the magnetic lines passed through the entire length of the coil. It is obvious that by inserting an iron core in the coil this result could be effected; but such an arrangement would be entirely unsuited for use on alternating transmission lines because of the reactive effect on the line-current and the loss of energy in the coil due to hysteresis and eddy currents. By my improved form of coil I secure an advantageous distribution of the magnetic lines, while retaining all the advantages of a coil free from iron. In Fig. 3 I have shown such a coil and also indicated by radiating lines the magnetic distribution which would be set up by current in the coil.